US008890916B2

(12) United States Patent
Furuyama (10) Patent No.: US 8,890,916 B2
(45) Date of Patent: Nov. 18, 2014

(54) ELECTRONIC DEVICE

(71) Applicant: Toshiyuki Furuyama, Nagoya (JP)

(72) Inventor: Toshiyuki Furuyama, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/187,550

(22) Filed: Feb. 24, 2014

(65) Prior Publication Data

US 2014/0240438 A1    Aug. 28, 2014

(30) Foreign Application Priority Data

Feb. 28, 2013    (JP) .................................. 2013-039002

(51) Int. Cl.
*B41J 3/36*    (2006.01)
*H01M 2/10*    (2006.01)

(52) U.S. Cl.
CPC .......... *H01M 2/1022* (2013.01); *H01M 2/1055* (2013.01); *B41J 3/36* (2013.01)
USPC ........................................................ 347/222

(58) Field of Classification Search
USPC ................................................. 347/171, 222
See application file for complete search history.

(56) References Cited

U.S. PATENT DOCUMENTS 8,366,264 B2 *    2/2013    Inaba et al. .................... 347/109

FOREIGN PATENT DOCUMENTS

| EP | 2258555 | * | 12/2010 | ................ B41J 3/36 |
| JP | 07282790 |   | 10/1995 |  |
| JP | 08162080 |   | 6/1996 |  |
| JP | 2010-234581 | * | 10/2010 | ................ B41J 3/36 |
| JP | 2010-274628 | * | 12/2010 | ................ B41J 3/36 |
| JP | 2010-274638 | * | 12/2010 | ................ B41J 3/36 |
| JP | 2010-284879 | * | 12/2010 | ................ B41J 3/36 |

* cited by examiner

*Primary Examiner* — Huan Tran
(74) *Attorney, Agent, or Firm* — McCarter & English, LLP (57) ABSTRACT

The disclosure discloses an electronic device comprising a battery accommodating portion. The battery accommodating portion is configured to alternatively accommodate a plural of cylindrical dry batteries or a cuboid rechargeable battery. The battery accommodating portion, when a plurality of the dry batteries are arranged by being stacked in two tiers or more into a heaped bale structure when the dry batteries are accommodated, comprises a plurality of support recess portions configured to support a plurality of the dry batteries in a bottom tier, respectively. An interval between axes of the support recess portions adjacent to each other is larger than an outer diameter of each of the dry batteries and is smaller than twice of the outer diameter of each of the dry batteries.

10 Claims, 8 Drawing Sheets

FIG. 8A
EMBODIMENT

FIG. 8B
COMPARATIVE EXAMPLE

ELECTRONIC DEVICE

CROSS-REFERENCE TO RELATED APPLICATION

The present application claims priority from Japanese Patent Application No. 2013-039002, which was filed on Feb. 28, 2013, the disclosure of which is incorporated herein by reference in its entirety.

BACKGROUND

1. Field

The present disclosure relates to an electronic device driven by power supplied from dry batteries or a rechargeable battery.

2. Description of the Related Art

A battery accommodating device in which both a dry battery as a primary battery and a rechargeable battery as a secondary battery can be used separately is known, for example. This battery accommodating device is used by being integrally mounted on an electronic device such as a handheld small-sized video camera.

The above described battery accommodating device is used by being integrally mounted on a handheld electronic device such as a small-sized video camera. Thus, the size is preferably made as small as possible.

In the above described battery accommodating device, a plurality of dry batteries is arranged by being stacked in two tiers into a heaped bale structure when the dry batteries are accommodated. At this time, since the adjacent dry batteries are arranged in contact with each other on an upper tier, a height in a stacking direction of the dry batteries stacked and arranged becomes high, which increases a thickness of the battery accommodating device.

SUMMARY

The present disclosure has an object to provide an electronic device which can reduce the thickness by reducing a height of a battery accommodating portion.

In order to achieve the above-described object, according to the aspect of the present application, there is provided an electronic device comprising a battery accommodating portion configured to alternatively accommodate a plural of cylindrical dry batteries or a cuboid rechargeable battery, the battery accommodating portion, when a plurality of the dry batteries are arranged by being stacked in two tiers or more into a heaped bale structure when the dry batteries are accommodated, comprising a plurality of support recess portions configured to support a plurality of the dry batteries in a bottom tier, respectively, and an interval between axes of the support recess portions adjacent to each other being larger than an outer diameter of each of the dry batteries and being smaller than twice of the outer diameter of each of the dry batteries.

An electronic device of the present disclosure has a battery accommodating portion which can alternatively accommodate dry batteries or a rechargeable battery. The electronic device is driven by power supplied from the dry batteries or the rechargeable battery accommodated in this battery accommodating portion.

In the present disclosure, when the dry batteries are accommodated in the battery accommodating portion, a plurality of the dry batteries are arranged by being stacked in two tiers or more into a heaped bale structure, and the adjacent dry batteries are arranged on each tier separately from each other. As a result, an overlapping width in a stacking direction of the dry batteries of the adjacent tiers (a first tier and a second tier, for example) can be made larger than that in a case where the adjacent dry batteries are arranged in contact with each other on each tier. As a result of these arrangements, since a height in the stacking direction of the plurality of dry batteries stacked and arranged can be reduced (in other words, a height of the battery accommodating portion can be reduced), a thickness of the electronic device can be reduced. Therefore, the electronic device can be made compact.

Moreover, since the overlapping width in the stacking direction of the dry batteries on the adjacent tiers becomes large, movement in a width direction (transverse direction) of the dry batteries is regulated, and an effect of suppressing rattling of the dry batteries can be improved.

DETAILED DESCRIPTION OF THE PREFERRED EMBODIMENTS

An embodiment of the present disclosure will be described below by referring to the attached drawings. In the following explanation, terms "upper", "lower", "front", "rear", and "width" of a label producing device 1 correspond to arrow directions indicated as appropriate in each drawing such as FIG. 1 and the like, respectively, and a term "thickness" of the label producing device 1 refers to a thickness in a front-back direction.

<Entire Structure of Label Producing Device>

Figure 1:
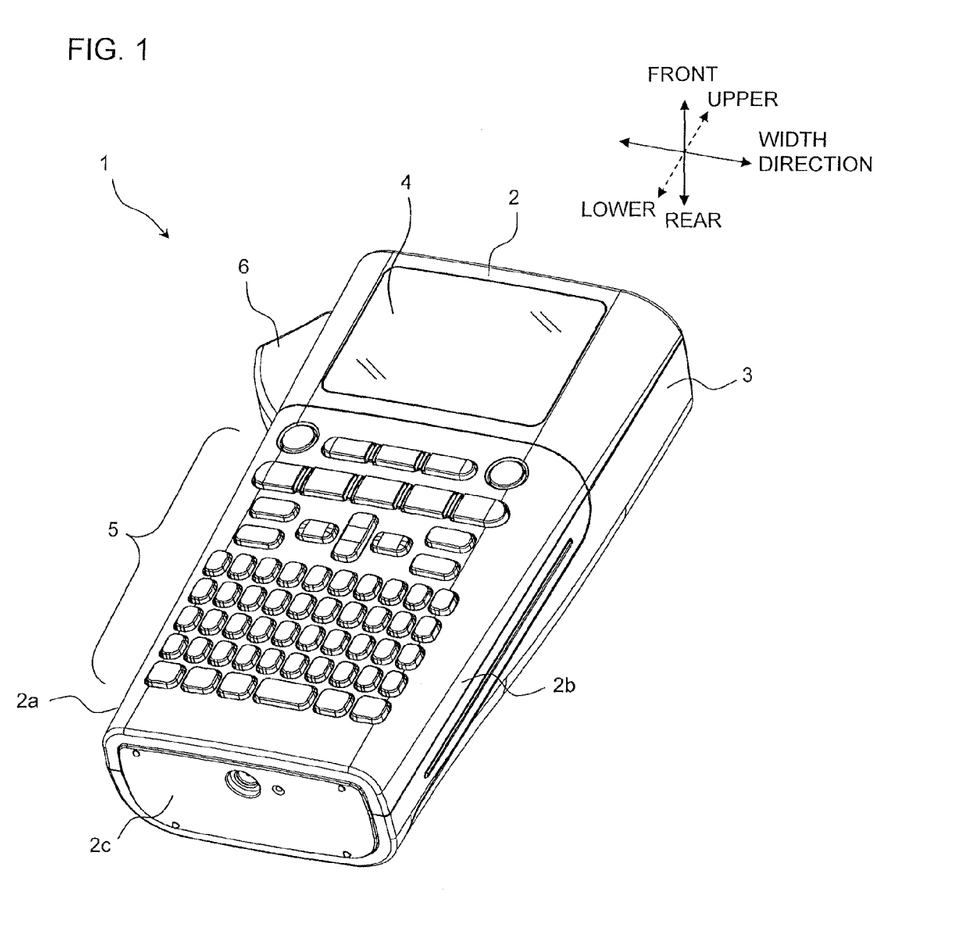
FIG. 1 is a perspective view illustrating an appearance on a front side of a label producing device of an embodiment of the present disclosure.
Figure 2:
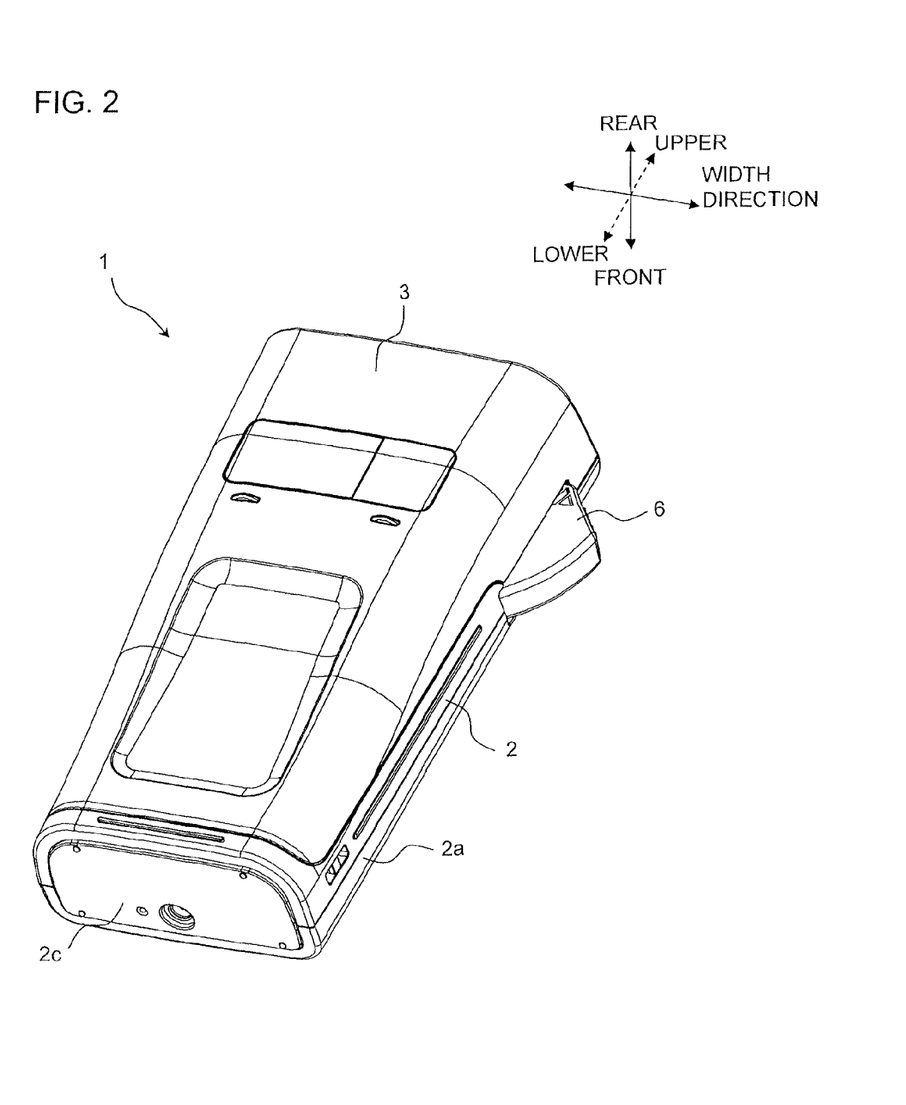
FIG. 2 is a perspective view illustrating an appearance of a rear side of the label producing device of the embodiment of the present disclosure.

As illustrated in FIGS. 1 and 2, the label producing device 1 is a handheld electronic device held by a hand of a user. The label producing device 1 includes a device main body 2 and a cover 3 detachably attached to a rear surface of this device main body 2.

The device main body 2 has a substantially flat cuboid shape which is thin and long in a vertical direction, a liquid crystal display portion 4 for displaying print data, a setting screen and the like is disposed on an upper part on a front surface of the device main body 2, while a keyboard portion 5 for operating the label producing device 1 is disposed on a lower side of the liquid crystal display portion 4. On this keyboard portion 5, a key group including character keys such as characters, symbols, and numerals and various functions keys is arranged. Moreover, on an upper part of a side wall portion 2a on one side in a width direction of the device main body 2 (left side in FIG. 1 and right side in FIG. 2), a cut operation lever 6 is disposed for cutting a label tape with print.

<Structure of Cover>

Figure 3:
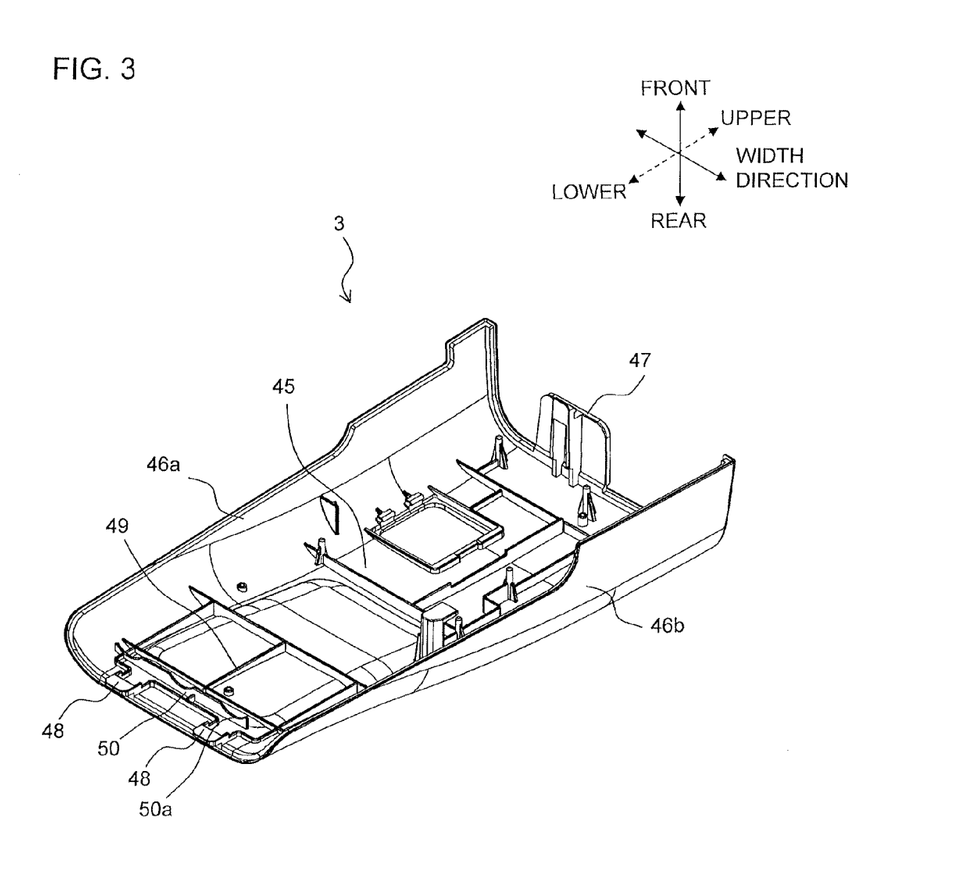
FIG. 3 is a perspective view illustrating a structure of an inside of a cover.

FIG. 3 illustrates a structure of an inside of the cover 3. As illustrated in FIG. 3, the cover 3 has a bottom portion 45, a side surface portion 46a erected on one side in the width direction of the bottom portion 45 (upper left side in FIG. 3), and a side surface portion 46b erected on the other side in the width direction (lower right side in FIG. 3) and is formed having a substantially U-shape on a side view when seen from a vertical direction. A projecting piece 47 erected in a thickness direction of the device main body 2 from a substantially center part is formed on an upper end portion of the bottom portion 45. The side surface portion 46a on the one side in the width direction is formed having a stepped shape with a height in an erected direction (the same as the front-back direction) gradually decreasing in three stages from the upper end portion toward a lower end portion. Similarly, the side surface portion 46b on the other side in the width direction is formed having a stepped shape with the height in the upright direction gradually decreasing in two stages from the upper end portion toward the lower end portion.

On a lower end of the bottom portion 45 of the cover 3, insertion pieces 48 are disposed on two spots in the width direction, which are inserted into engagement holes 2c1 (see FIG. 4) disposed on two spots in the width direction of a lower part 2c of the device main body 2 when the cover 3 is attached to a rear surface portion of the device main body 2.

Moreover, on a lower part of the bottom portion 45 of the cover 3, a square frame shaped first rib 49 set in the width direction and the vertical direction of the device main body 2 and a second rib 50 arranged further closer to a lower side of the first rib 49 and having arc-shaped notches 50a at three spots in the width direction are erected. Heights of the ribs 49 and 50 are set so that a height of an upper end in an erected direction of the first rib 49 and a height in the erected direction of an arc center part of the notch 50a of the second rib 50 are substantially equal to each other.

The first rib 49 is configured so as to be brought into contact with and press a surface of a rechargeable battery 33 when the rechargeable battery 33 (see FIG. 7 which will be described later) is accommodated in a battery accommodating portion 30 (see FIGS. 4, 5 and the like which will be described later) and the cover 3 is attached to the rear surface portion of the device main body 2. Moreover, the second rib 50 is configured so as to fit and press an upper end of each of dry batteries 32 located on an upper tier in a stacking direction (the same as a front-back direction) in the notch 50a when the plurality of dry batteries 32 (see FIG. 6 which will be described later) is accommodated in the battery accommodating portion 30 into a heaped bale structure and the cover 3 is attached to the rear surface portion of the device main body 2.

In order to attach the cover 3 to the rear surface portion of the device main body 2, the two insertion pieces 48 on the lower end of the cover 3 are inserted into the engagement holes 2c1 at the two spots on the lower part 2c of the device main body 2, the projecting piece 47 on the upper end of the cover 3 is inserted into a locking opening portion 9 (FIG. 4) on the upper end of the device main body 2 and locked thereby. As a result, the cover 3 is attached to the rear surface portion of the device main body 2, and the cover 3 covers a label producing portion 10 which will be described later and the battery accommodating portion 30 of the device main body 2.

<Label Production Mechanism of Label Producing Device>

Figure 4:
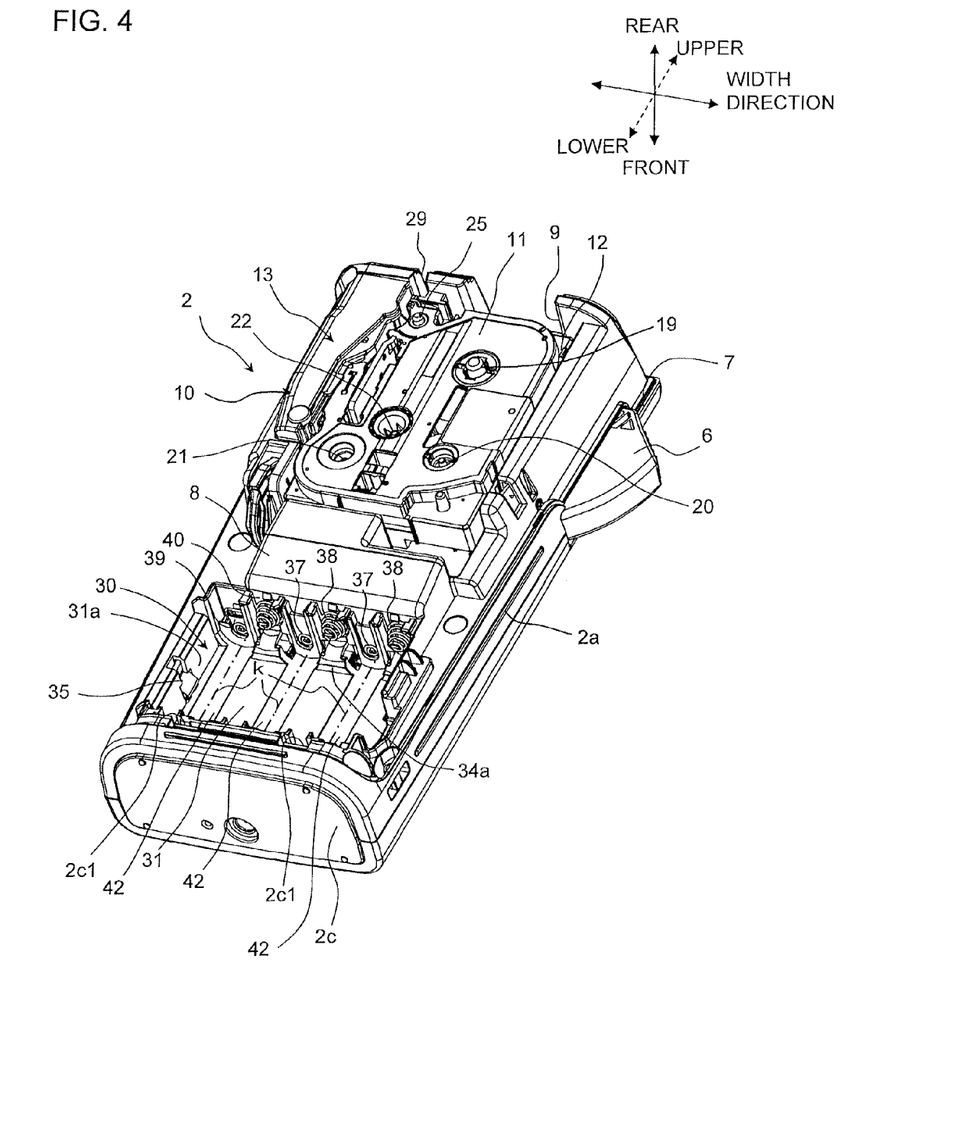
FIG. 4 is a perspective view illustrating an internal structure on the rear side of a device main body in a state in which a battery is not accommodated.
Figure 5:
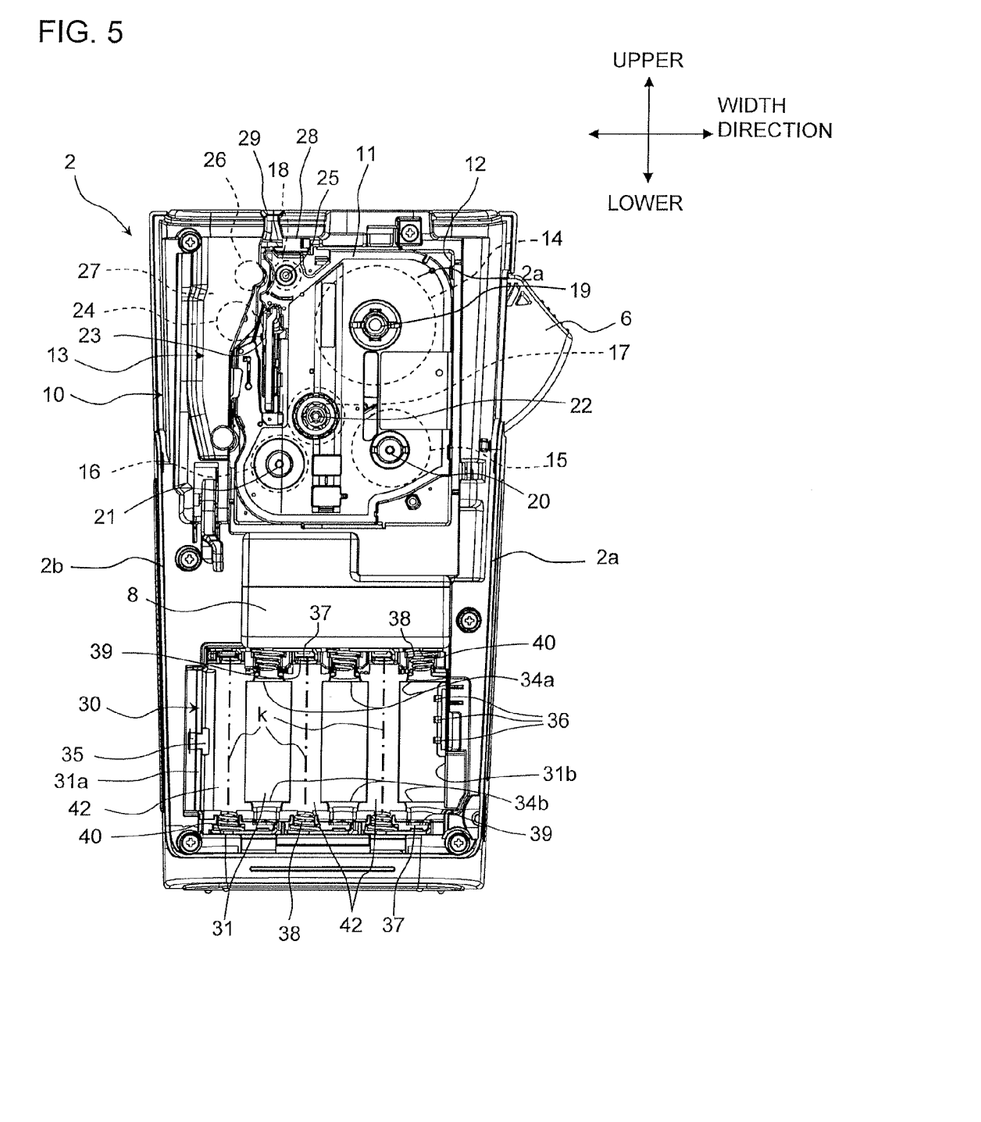
FIG. 5 is a plan view illustrating the internal structure on the rear side of the device main body in the state in which the battery is not accommodated.

As illustrated in FIGS. 4 and 5, the device main body 2 includes the label producing portion 10 and the battery accommodating portion 30. The label producing portion 10 and the battery accommodating portion 30 are divided by an accommodation portion 8 in which a control board, a motor and the like, not shown, are accommodated. Moreover, as illustrated in FIGS. 4 and 5, on side wall portions 2a and 2b on the one side and the other side in the width direction of the device main body 2, a stepped portion 7 having a shape corresponding to an end portion on an open side of the cover 3 is disposed. The locking opening portion 9 is disposed on the upper end of the device main body 2.

The label producing portion 10 has a recess-shaped cartridge holder 12 to which a cartridge 11 is detachably attached and which is disposed so as to constitute a majority of a substantially upper half of the device main body 2 and a printing/feeding mechanism 13 disposed in a region including the other side in the width direction (left side in FIGS. 4 and 5) of the cartridge holder 12. The cartridge 11 includes a base tape roll 14, a cover film roll 15, an ink ribbon roll 16, an ink ribbon take-up roller 17, and a feeding roller 18 therein as illustrated in FIG. 5.

The printing/feeding mechanism 13 includes a support shaft 19 of the base tape roll 14, a support shaft 20 of the cover film roll 15, a support shaft 21 of the ink ribbon roll 16, a take-up shaft 22 of the ink ribbon, a thermal head 23, a platen roller 24, a drive shaft 25 of the feeding roller 18, a pressing roller 26 and the like. The platen roller 24 and the pressing roller 26 are mounted on a roll holder 27 and can be switched between a printing/feeding position (a position illustrated in FIG. 5 and the like) in contact with the thermal head 23 and the feeding roller 18, respectively, and a standby position (not shown) separated from the thermal head 23 and the feeding roller 18 by swing of the roll holder 27.

When a print label is to be produced, the platen roller 24 and the pressing roller 26 are switched to the printing/feeding position. The platen roller 24 switched to the printing/feeding position is rotated by driving by a drive shaft, not shown, on the device main body 2 side and presses the cover film fed out of the cover film roll 15 and the ink ribbon fed out of the ink ribbon roll 16 onto the thermal head 23. As a result, the thermal head 23 applies a desired print on the cover film in accordance with print data, and the platen roller 24 feeds the cover film and the ink ribbon having finished with the print toward the feeding roller 18. The ink ribbon having finished with the print is subsequently separated from the cover film and taken up by the ink ribbon take-up roller 17.

On the other hand, the pressing roller 26 switched to the printing/feeding position presses the cover film fed by the platen roller 24 and having finished with the print and the base tape fed out of the base tape roll 14 onto the feeding roller 18 rotated by driving by the drive shaft 25. As a result, while the cover film having finished with the print and the base tape are bonded together so as to form a label tape with print, the feeding roller 18 feeds the label tape with print toward a label discharging exit 29 disposed on the upper end of the device main body 2. Then, when a user manually operates the cut operation lever 6 at a predetermined timing when the label tape with print is discharged from the label discharging exit 29, a cutter 28 disposed in the vicinity of the label discharging exit 29 is operated, the label tape with print is cut, and a print label having a desired length is formed.

<Battery Accommodating Portion>

Figure 6:
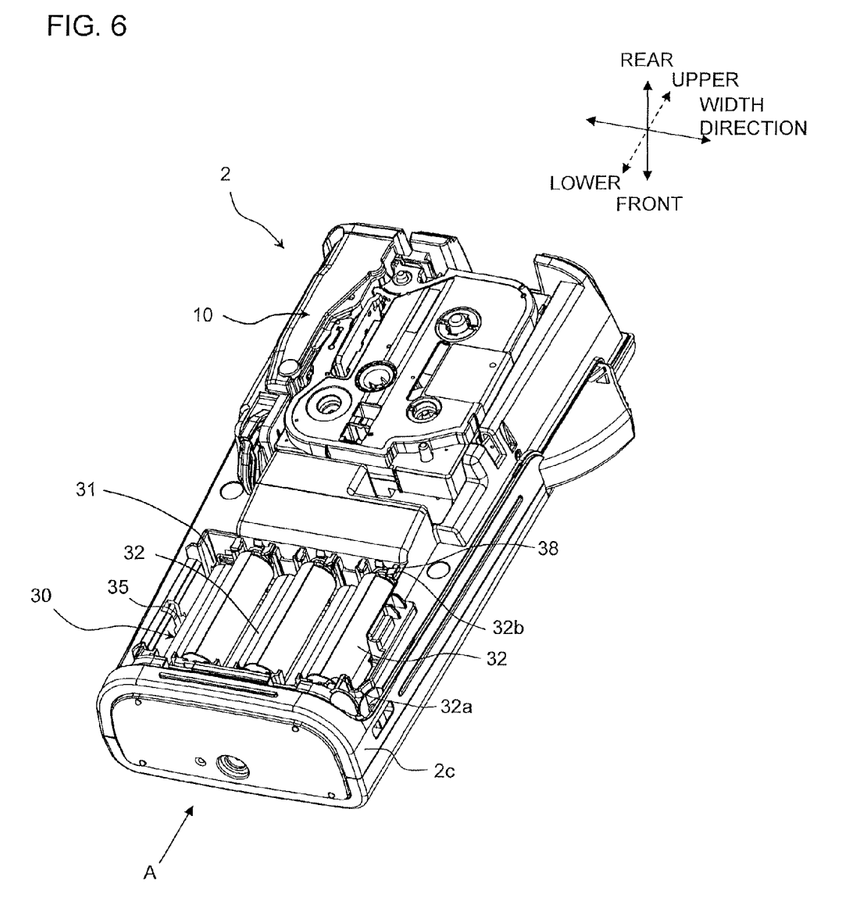
FIG. 6 is a perspective view illustrating the internal structure on the rear side of the device main body in a state in which the battery is accommodated.

The battery accommodating portion 30 will be described by referring to FIGS. 6 to 8 in addition to the above described FIGS. 4 and 5. In the following explanation of the battery accommodating portion 30, as illustrated in FIG. 8, beside the terms "upper" and "lower" of the label producing device 1 illustrated in FIGS. 1 to 3, a stacking direction of the dry batteries 32 is referred to as a height direction, a direction in which a tier is stacked and increased in the height direction (the same as a rear direction of the label producing device 1) is referred to as "upper", and a direction opposite thereto is referred to as "lower" for convenience of explanation. FIG. 8A is a diagram conceptually illustrating arrangement of the dry batteries 32 when the battery accommodating portion 30 is seen from a lower direction (an arrow A direction in FIG. 6) of the device main body 2.

The battery accommodating portion 30 is formed as a recess portion having a substantially rectangular shape in a planar view which is long in the width direction of the device main body 2 and can alternatively accommodate a plurality of (six in this example) cylindrical dry batteries 32 or one rectangular rechargeable battery 33 (a lithium ion battery pack, for example). As illustrated in FIG. 6, the six dry batteries 32 are accommodated in the battery accommodating portion 30 by being stacked in a plurality of tiers, or two tiers in this example in which their longitudinal directions are matched with the vertical direction of the device main body 2 into a heaped bale structure. The six dry batteries 32 stacked into the heaped bale structure in the battery accommodating portion 30 are arranged in the same number on each tier, that is, three each. The direction of electrodes of the dry batteries 32 is different from that on the adjacent tier, and the directions of the electrodes of the dry batteries 32 are the same on the same tier in the arrangement. As illustrated in FIG. 7, if the rechargeable battery 33 is to be accommodated instead of the dry batteries 32, the rechargeable battery 33 is accommodated in the battery accommodating portion 30 such that the longitudinal directions are matched with the width direction of the device main body 2 so that the longitudinal direction crosses the dry batteries 32 at a right angle.

As illustrated in FIGS. 4 and 5, at positions on the one side (upper sides in FIGS. 4 and 5) and the other side (lower sides in FIGS. 4 and 5) of the battery accommodating portion 30 extending along the vertical direction of the device main body 2, a first side wall 34a and a second side wall 34b to be brought into contact with end faces in a width direction of the rechargeable battery 33 to be accommodated in the battery accommodating portion 30, respectively, are disposed. On an inner wall portion 31a on the one side (left sides in FIGS. 4 and 5) of the battery accommodating portion 30 extending along the width direction of the device main body 2, a plate spring 35 for pressing an end face on one side in the longitudinal direction (left sides in FIGS. 4 and 5) of the rechargeable battery 33 to be accommodated in the battery accommodating portion 30 is disposed, while on an inner wall portion 31b on the other side (right sides in FIGS. 4 and 5) of the battery accommodating portion 30, a terminal 36 to be brought into contact with the electrode located on the end face on the other side in the longitudinal direction (right sides in FIGS. 4 and 5) of the rechargeable battery 33 is disposed. This terminal 36 is arranged in an empty space where the dry battery 32 is not arranged (in other words, a region not interfering with or obstructing the dry battery 32) when the dry batteries 32 are accommodated in the battery accommodating portion 30 (see FIG. 5 and FIG. 8A which will be described later). Moreover, the plate spring 35 is arranged at a position where the plate spring is brought into contact with the dry battery 32 in the bottom tier and is deflected when the dry batteries 32 are accommodated in the battery accommodating portion 30 (see FIG. 6 and FIG. 8A which will be described later).

Figure 7:
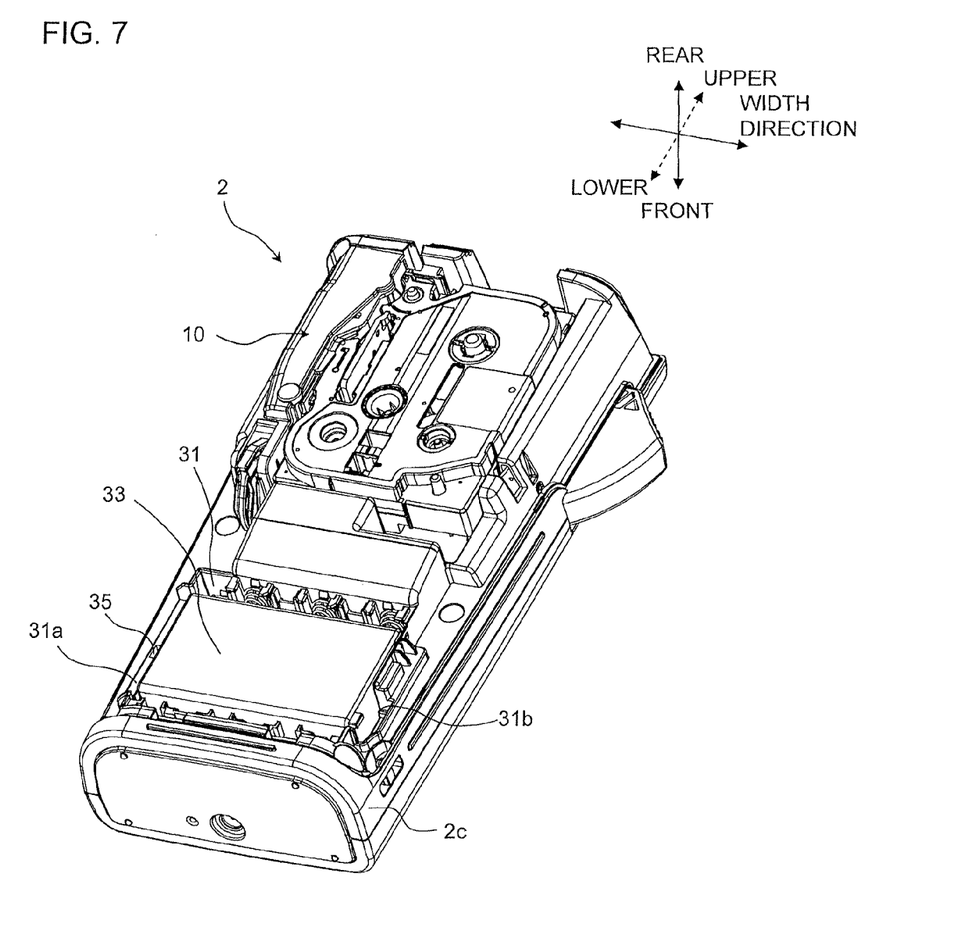
FIG. 7 is a perspective view illustrating the internal structure on the rear side of the device main body in the state in which a rechargeable battery is accommodated.
Figure 8A:
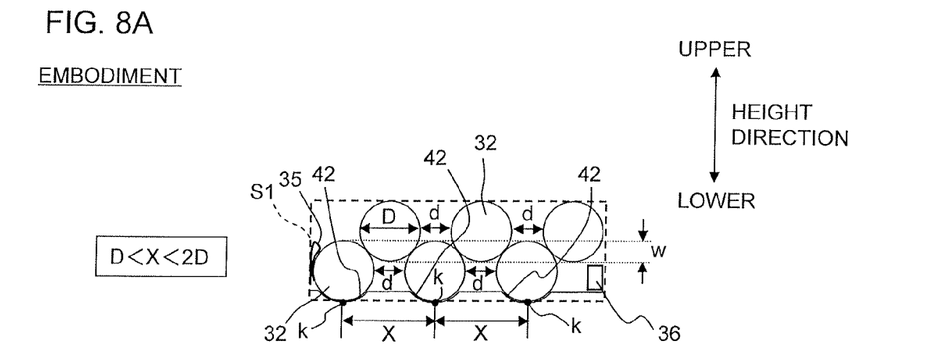
FIG. 8A is an explanatory diagram illustrating an installation space for a battery accommodating portion in which a plurality of dry batteries is stacked into a heaped bale structure with an interval between the dry batteries on each tier.
Figure 8B:
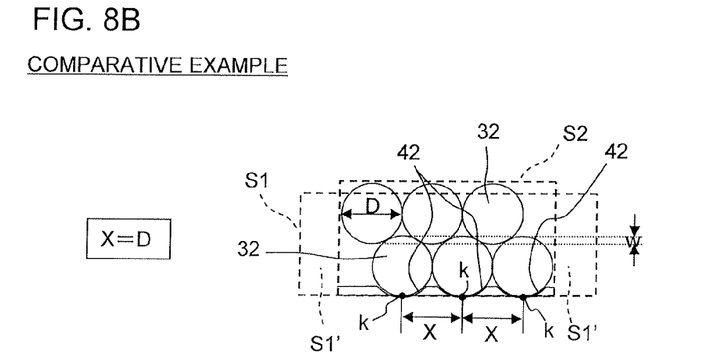
FIG. 8B is an explanatory diagram illustrating an installation space for a battery accommodating portion in which a plurality of dry batteries is stacked into the heaped bale structure without an interval between the dry batteries on each tier.

The rechargeable battery 33 is, as illustrated in FIG. 7, accommodated in the battery accommodating portion 30 in a posture with the longitudinal direction as the width direction of the device main body 2, the end face on the one side in the longitudinal direction is pressed by the plate spring 35 of the inner wall portion 31a of the battery accommodating portion 30, and the electrode, not shown, on the end face on the other side in the longitudinal direction is brought into contact with the terminal 36 (see FIG. 5) of the inner wall portion 31b of the battery accommodating portion 30.

As illustrated in FIGS. 4 and 5, on a lower side in the height direction of the battery accommodating portion 30 in the first side wall 34a, in dry batteries 32 stacked in plural tiers (two tiers in this example), first terminals 37 for positive electrodes of the dry batteries 32 on a lower tier are disposed in the number of three at predetermined intervals in a width direction. Moreover, on the lower side in the height direction in the second side wall portion 34b, second terminals 38 for negative electrodes of the dry batteries 32 on the lower tier are disposed in the number of three at positions facing the first terminals 37 for positive electrodes. Moreover, on an upper side in the height direction in the first side wall 34a, in the dry batteries 32 stacked on the battery accommodating portion 30, the second terminals 38 for negative electrodes of the dry batteries 32 on the upper tier are disposed in the number of three at equal intervals by being displaced by a predetermined length from the first terminal 37 on the lower part in the width direction of the device main body 2. Moreover, on the upper side in the height direction in the second side wall portion 34b, the first terminals 37 for positive electrodes of the dry batteries 32 are disposed in the number of three at positions facing the second terminals 38 for negative electrodes. The first terminal 37 is formed of a conductive metal plate, for example. The second terminal 38 is formed of a coil spring (may be a plate spring), for example, of a conductive metal and is bulkier than the first terminal 37.

An installation interval between the first terminal 37 and the second terminal 38 is set such that, when six dry batteries 32 are stacked in two tiers in three each into a heaped bale structure by bringing a positive electrode 32a of the dry battery 32 into contact with the first terminal 37 and by bringing a negative electrode 32b of the dry battery 32 into contact with the second terminal 38, as illustrated in FIG. 8A, a predetermined interval d is disposed between the adjacent dry batteries 32 in each of the upper tier and the lower tier and are arranged separately from each other. That is, on a bottom portion 31 of the battery accommodating portion 30, a shallow recess portion 42 on which a lower end of a barrel part of the dry battery 32 inserted between the first terminal 37 and the second terminal 38 is arranged is disposed. The recess portions 42 are disposed in plural (three in this example), and each of the recess portions 42 has a vertical axis k. At this time, an interval X between the axes k and k of the adjacent recess portions 42 and 42 is larger than an outer diameter D of the dry battery 32 and is smaller than twice of the outer diameter D. As a result of these arrangements, the heaped bale structure of two tiers with three on the upper tier and three on the lower tier as described above is realized.

The first terminal 37 is installed in a first recess portion 39 disposed so as to be recessed in the vertical direction of the device main body 2 on the first side wall 34a and the second side wall 34b, and the second terminal 38 is installed in a second recess portion 40 disposed so as to be recessed in the vertical direction of the device main body 2 on the first side wall 34a and the second side wall 34b. Regarding the second recess portion 40, since the second terminal 38 bulkier than the first terminal 37 for a positive electrode is installed, recess amounts from the side walls 34a and 34b are larger than the recess amount of the first recess portion 39 on which the first terminal 37 is installed.

The six dry batteries 32 are accommodated in the battery accommodating portion 30 as follows. First, on the first tier, three dry batteries 32 are inserted in the battery accommodating portion 30 so that a positive electrode 32a (see FIG. 6) is directed to the first side wall 34a side and a negative electrode 32b (see FIG. 6) directed to the second side wall 34b side, and each of the dry batteries 32 is interposed between the first terminal 37 and the second terminal 38. As a result, the positive electrode 32a is brought into contact with the first terminal 37, and the negative electrode 32b is brought into contact with the second terminal 38. Subsequently, on the second tier, the remaining three dry batteries 32 are inserted in the battery accommodating portion 30 in a direction opposite to the above, that is, so that the positive electrode 32a is directed to the second side wall 34b side and the negative electrode 32b is directed to the first side wall 34a side, and each of the dry batteries 32 is interposed between the first terminal 37 and the second terminal 38. As a result, the positive electrode 32a is brought into contact with the first terminal 37, and the negative electrode 32b is brought into contact with the second terminal 38.

As a result, as illustrated in FIG. 8A, the dry batteries 32 adjacent on each of the first and second tiers are arranged separately at the intervals d from each other. At this time, as described above, since a height of the upper end in the erected direction of the first rib 49 becomes substantially equal to the height in the erected direction of the arc center part of the notch 50a of the second rib 50, the height of the upper end portion of the top tier (second tier) of the dry battery 32 substantially accords with the height of the top surface of the rechargeable battery 33 when the rechargeable battery 33 is accommodated. As a result of these arrangements, as illustrated in FIG. 8A, when the battery accommodating portion 30 is seen from the vertical direction of the device main body 2, all the six dry batteries 32 are accommodated in a space S1 occupied by the rechargeable battery 33 accommodated in the battery accommodating portion 30.

On the other hand, as illustrated in FIG. 8, in the case of a comparative example in which the dry batteries 32 are stacked into the heaped bale structure so that the dry batteries 32 on each tier are in contact without an interval, the height of a top surface of the dry battery 32 on the upper tier becomes higher than a top surface of the installation space S1 of the rechargeable battery 33. As a result of these arrangements, an installation space S2 which is higher in a stacking direction than the installation space S1 of the rechargeable battery 33 is required for accommodating the dry battery 32, and a thickness of the device main body 2 is increased. Moreover, a wasteful space S1' is generated in the installation space S1 of the rechargeable battery 33.

<Effect of Embodiment>

As described above, the label producing device 1 of the present embodiment has the battery accommodating portion 30 which can alternatively accommodate the cylindrical dry battery 32 or the cuboid rechargeable battery 33. The label producing device 1 is driven by power supplied from the dry battery 32 or the rechargeable battery 33 accommodated in this battery accommodating portion 30.

At this time, when the dry battery 32 is accommodated in the battery accommodating portion 30, a plurality of (six in the present embodiment) dry batteries 32 is arranged by being stacked in two tiers or more (two tiers in the present embodiment) into the heaped bale structure, and the dry batteries 32 adjacent on each tier are arranged separately from each other. As a result, as in the comparative example illustrated in FIG. 8B, an overlapping width w in the stacking direction between the dry batteries 32 on the adjacent tiers (first and second tiers in the present embodiment) can be made larger than that in a case where the adjacent dry batteries 32 are arranged in contact with each other on each tier. As a result of these arrangements, a height in the stacking direction of the plurality of dry batteries 32 arranged in a stacked manner can be reduced (in other words, the height of the battery accommodating portion 30 can be reduced), and thus, the thickness of the label producing device 1 can be reduced. Therefore, the size of the label producing device 1 can be made compact.

Moreover, since the overlapping width w in the stacking direction between the dry batteries 32 on the adjacent tiers becomes larger, movement in a width direction (left-and-right direction in FIG. 8) of the dry battery 32 is regulated, and an effect of suppressing rattling of the dry battery 32 can be improved.

Moreover, particularly in the present embodiment, the following effects are exerted. That is, if the label producing device 1 has the cover 3 covering the battery accommodating portion 30, when the height of the upper end portion on the top tier of the dry battery 32 in an accommodated state is different from the height of the top surface of the rechargeable battery 33 in the accommodated state as in the comparative example illustrated in FIG. 8B, the cover 3 needs to have a thickness at least larger than a difference of those heights so that the dry battery 32 and the rechargeable battery 33 can be both covered. On the other hand, in the present embodiment, as described above, the battery accommodating portion 30 is configured so that the height of the upper end portion on the top tier of the dry battery 32 in the accommodated state substantially accords with the height of the top surface of the rechargeable battery 33 in the accommodated state. As a result, the thickness of the cover 3 can be made thinner than the case in which those heights are different as described above. Therefore, the thickness of the label producing device 1 can be further reduced.

Moreover, particularly in the present embodiment, the following effects are exerted. That is, the dry battery 32 has the positive electrode 32a and the negative electrode 32b on both sides in its longitudinal direction, and the substantially cuboid rechargeable battery 33 generally has an electrode on an end face side in its longitudinal direction. Thus, in the present embodiment, the battery accommodating portion 30 is configured such that the longitudinal direction of the dry battery 32 in the accommodated state and the longitudinal direction of the rechargeable battery 33 in the accommodated state substantially cross each other at a right angle. As a result, in the battery accommodating portion 30, the terminals 37 and 38 for the dry batteries 32 and the terminal 36 for the rechargeable battery 33 can be arranged by being distributed to different side walls (the first side wall 34a and the second side wall 34b as well as the inner wall portion 31b) crossing each other substantially at a right angle. As a result of these arrangements, the side walls can be made smaller than the case in which the terminals 37 and 38 for the dry batteries and the terminal 36 for the rechargeable battery are arranged concentratedly on a common side wall, and thus, the size of the battery accommodating portion 30 can be made small, and the label producing device 1 can be made further compact.

Moreover, particularly, in the present embodiment, the following effects are exerted. That is, since for the second terminal 38 in contact with the negative electrode 32b of the dry battery 32, a coil spring, a plate spring or the like is used for elastically urging the dry battery 32, the second terminal 38 becomes a terminal having a protruding amount larger than the first terminal 37 in contact with the positive electrode 32a. In the present embodiment, recess amounts from the first side wall 34a and the second side wall 34b of the second recess portion 40 on which the second terminal 38 which is a relatively large terminal as above is disposed are set larger than a recess amount of the first recess portion 39 on which the first terminal 37 is disposed. As a result, since both the first terminal 37 and the second terminal 38 can be accommodated in the recess portions 39 and 40 without protrusion from the side wall 34 (34a, 34b), the terminals 37 and 38 do not interfere with carrying in/out of the rechargeable battery 33 with respect to the battery accommodating portion 30, and the rechargeable battery 33 can be attached/detached smoothly.

Moreover, particularly in the present embodiment, the following effects are exerted. That is, as described above, the second terminal 38 to be brought into contact with the negative electrode 32b of the dry battery 32 is larger than the first terminal 37 to be brought into contact with the positive electrode 32a. Therefore, if the second terminals 38 are arranged concentratedly on the side wall on one side (the first side wall 34a, for example) of the battery accommodating portion 30 and the first terminals 37 are arranged concentratedly on the side wall on the other side (the second side wall 34b, for example), terminal arrangement becomes imbalanced, and it is likely that the size of the battery accommodating portion 30 is increased by an increase in an area of the side wall on the one side. Thus, in the present embodiment, in the battery accommodating portion 30, the plurality of dry batteries 32 is arranged such that directions of the positive electrodes 32a and the negative electrodes 32b of the dry batteries 32 on each tier become the same, and the directions of the positive electrodes 32a and the negative electrodes 32b of the dry batteries 32 on the adjacent tiers become opposite. As a result, in each of the side wall portions 34a and 34b of the battery accommodating portion 30, the plurality of first terminals 37 and the plurality of the second terminals 38 are alternately arranged on each tier, and thus, terminal arrangement becomes balanced, and the size of the battery accommodating portion 30 can be reduced.

Moreover, particularly, in the present embodiment, in the battery accommodating portion 30, the plurality of dry batteries 32 is arranged by being stacked in two tiers into the heaped bale structure and also arranged so that the number of the dry batteries 32 on each tier becomes the same. By making the numbers of the dry batteries 32 on the first tier and the second tier the same as above, a weight balance in the thickness direction of the label producing device 1 can be improved. Moreover, since the numbers of the first terminals 37 and the second terminals 38 on the first side wall 34a on one side and the second side wall 34b on the other side of the battery accommodating portion 30 become the same, a balance of the terminal arrangement can be further improved.

Moreover, particularly, in the present embodiment, the battery accommodating portion 30 is configured such that the six dry batteries 32 are arranged by being stacked in two tiers into the heaped bale structure and the number of the dry batteries 32 on each tier becomes three. As above, by using six dry batteries 32, required electric power can be supplied also to an electronic device requiring a considerably large current when a plurality of heat generating elements of the thermal head 23 is electrified as in the label producing device 1.

Moreover, particularly, in the present embodiment, a battery accommodation structure by the aforementioned battery accommodating portion 30 is applied to the handheld label producing device 1 used by being carried by a user. Thus, the thickness of the label producing device 1 can be made smaller by the arrangement of the dry batteries 32 in the battery accommodating portion 30 and thus, portability can be improved, which is extremely effective.

The present disclosure is not limited to the aforementioned embodiment and is capable of various variations within a range not departing from the grit and technical idea thereof.

Other than those described above, the methods by the embodiment can be combined in use as appropriate.

What is claimed is:

1. An electronic device comprising:
   a battery accommodating portion configured to alternatively accommodate a plural of cylindrical dry batteries or a cuboid rechargeable battery,
   said battery accommodating portion, when a plurality of said dry batteries are arranged by being stacked in two tiers or more into a heaped bale structure when said dry batteries are accommodated, comprising a plurality of support recess portions configured to support a plurality of said dry batteries in a bottom tier, respectively, and
   an interval between axes of said support recess portions adjacent to each other being larger than an outer diameter of each of said dry batteries and being smaller than twice of the outer diameter of each of said dry batteries.

2. The electronic device according to claim 1, further comprising:
   a cover configured to cover said battery accommodating portion, wherein
   said battery accommodating portion is configured, assuming that a stacking direction of said dry batteries is a height direction and a direction in which tiers of said dry batteries are increased along said height direction is an upper direction, so that a height of an upper end portion of a top tier of said dry batteries in an accommodated state of the dry batteries substantially accords with a height of a top surface of said rechargeable battery in an accommodated state of the rechargeable battery.

3. The electronic device according to claim 1, wherein:
   said battery accommodating portion is configured so that a longitudinal direction of each of said dry batteries in an accommodated state of the dry batteries is substantially orthogonal to a longitudinal direction of said rechargeable battery in an accommodated state of the rechargeable battery.

4. The electronic device according to claim 3, wherein:
   said battery accommodating portion comprises:
   a side wall configured to be in contact with an end face of the rechargeable battery in a width direction when said rechargeable battery is accommodated;
   a first recess portion which is disposed so as to be recessed from said side wall and in which a first terminal configured to be in contact with a positive electrode of the dry battery is disposed when said dry batteries are accommodated; and
   a second recess portion which is disposed so as to be recessed from said side wall and in which a second terminal configured to be in contact with a negative electrode of the dry battery is disposed when said dry batteries are accommodated,
   a recess amount of said second recess portion from said side wall is larger than said recess amount of said first recess portion from said side wall.

5. The electronic device according to claim 1, wherein:
said battery accommodating portion is configured so that directions of positive electrodes of said dry batteries are the same and directions of negative electrodes of said dry batteries are the same by each tier as well as the directions of the positive electrodes of said dry batteries on the adjacent tiers are opposite to each other and the directions of the negative electrodes of said dry batteries on the adjacent tiers are opposite to each other, when said dry batteries are accommodated.

6. The electronic device according to claim 1, wherein:
said battery accommodating portion is configured so that said plurality of dry batteries are arranged by being stacked in two tiers into the heaped bale structure, and the number of said dry batteries in each of the tiers is the same.

7. The electronic device according to claim 6, wherein:
said battery accommodating portion is configured so that six dry batteries are arranged by being stacked in two tiers into the heaped bale structure, and the number of said dry batteries in each of the tiers is three.

8. The electronic device according to claim 1, wherein:
the electronic device is a handheld label producing device comprising:
a cartridge holder to which a cartridge configured to supply a print-receiving tape is attached;
a feeder configured to be driven by electric power supplied from said dry batteries or said rechargeable battery accommodated in said battery accommodating portion and to feed said print-receiving tape supplied from said cartridge attached; and
a printing head configured to apply a desired print on said print-receiving tape fed by said feeder so as to produce a label.

9. The electronic device according to claim 1, further comprising:
a terminal configured to be in contact with an electrode of the rechargeable battery when said rechargeable battery is accommodated in said battery accommodating portion, wherein
said terminal is arranged in an empty space in the battery accommodating portion in which any dry battery is not accommodated when said plurality of dry batteries are accommodated in said battery accommodating portion.

10. The electronic device according to claim 9, further comprising:
a spring configured to press a portion of said rechargeable battery on an opposite side of said electrode when said rechargeable battery is accommodated in said battery accommodating portion, wherein
said spring is arranged at such a position that is in contact with the dry battery and is deflected when said plurality of dry batteries are accommodated in said battery accommodating portion.

* * * * *